United States Patent
Duesterwald et al.

(10) Patent No.: US 12,056,585 B2
(45) Date of Patent: Aug. 6, 2024

(54) ASSISTANT FOR LARGE-SCALE MACHINE LEARNING EXPERIMENTS

(71) Applicant: INTERNATIONAL BUSINESS MACHINES CORPORATION, Armonk, NY (US)

(72) Inventors: Evelyn Duesterwald, Millwood, NY (US); Anupama Murthi, Pleasantville, NY (US); Michael Hind, Cortlandt Manor, NY (US); Matthew Richard Arnold, Ridgefield Park, NJ (US); Benjamin Tyler Elder, White Plains, NY (US); Jiri Navratil, Cortlandt Manor, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 850 days.

(21) Appl. No.: 17/110,275

(22) Filed: Dec. 2, 2020

(65) Prior Publication Data

US 2022/0172109 A1    Jun. 2, 2022

(51) Int. Cl.
*G06N 20/00*    (2019.01)
*G06N 5/04*    (2023.01)
*G06N 3/0985*    (2023.01)

(52) U.S. Cl.
CPC .............. *G06N 20/00* (2019.01); *G06N 5/04* (2013.01); *G06N 3/0985* (2023.01)

(58) Field of Classification Search
CPC ......... G06N 20/00; G06N 5/04; G06N 3/0985
See application file for complete search history.

(56) References Cited

U.S. PATENT DOCUMENTS

| | | | |
|---|---|---|---|
| 8,229,900 B2 | 7/2012 | Houle | |
| 9,043,326 B2 | 5/2015 | Wunsch, Ii et al. | |
| 2005/0131850 A1* | 6/2005 | Cao | G06N 7/02 706/59 |
| 2014/0271453 A1* | 9/2014 | Dowell | G01N 33/57423 435/7.6 |
| 2017/0293835 A1* | 10/2017 | AlAjmi | E21B 49/00 |
| 2019/0392071 A1* | 12/2019 | Rao | G06N 20/00 |
| 2020/0074274 A1* | 3/2020 | Fan | G06F 17/18 |

(Continued)

FOREIGN PATENT DOCUMENTS

CN    110880015 A    3/2020

OTHER PUBLICATIONS

Vanschoren, J., "The Experiment Database for Machine Learning (Demo)"; LIACS (2018), Leiden University, The Netherlands, 8 pgs.

(Continued)

*Primary Examiner* — Beau D Spratt
(74) *Attorney, Agent, or Firm* — Intelletek Law Group, PLLC; Gabriel Daniel, Esq.

(57) ABSTRACT

A computer implemented method of performing large-scale machine learning experiments includes expanding on one or more input datasets by systematically generating several data set drift splits. A set of experimental jobs corresponding to the generated data set drift splits are executed to generate experimental results. The experimental results are processed, consolidated, and clustered according to the generated data set drift splits.

17 Claims, 5 Drawing Sheets

(56) References Cited

U.S. PATENT DOCUMENTS

2020/0097847 A1* 3/2020 Convertino ......... G06F 11/3447
2020/0250474 A1* 8/2020 Broby ..................... G06F 16/33
2021/0240927 A1* 8/2021 Zhao ...................... G06F 40/35

OTHER PUBLICATIONS

Blockeel, H. et al., "Experiment Databases: Towards an Improved Experimental Methodology in Machine Learning": PKDD (2007); LANI 4702; pp. 6-17.

Gardner, J. et al., "Enabling End-To-End Machine Learning Replicability: A Case Study in Educational Data Mining"; arXiv:1806.05208v2 [cs.CY] (2018); 10 pgs.

Anonymous, "System for Smart Feedback Data Collection for Unsupervised Machine Learning Models"; IPCOM000257230D, ip.com (2019); 3 pgs.

Anonymous, "Continuous Learning System for Machine Learning Experiments"; : IPCOM000257229D, ip.com (2019); 3 pgs.

Morris, R. et al., "Method of Improving Deep Learning Image Classification Using Unsupervised Clustering"; IP.com No. IPCOM000256974D (2019); 9 pgs.

Omnisol Information Systems Ltd, "Advanced Data Management for Lab Experiments"; www.omnisol.co.il/data-management-for-lab-experiments (downloaded Dec. 3, 2020); 5 pgs.

Neptune Labs Inc. "The Most Lightweight Experiment Management Tool that fits any Workflow"; https://Neptune.ai (downloaded Dec. 3, 2020); 4 pgs.

Github, "Open Source ML Model Versioning, Metadata, and Experiment Management"; https://github.com/VertaAI/modeldb, (downloaded Dec. 3, 2020); 7 pgs.

Github, "Sacred is a Tool to Help Configure, Organize, Log and Reproduce Experiments Developed a IDSIA"; https://github.com/IDSIA/sacred, (downloaded Dec. 3, 2020); 12 pgs.

Github, "Web-Based Dashboard for Sacred"; https://github.com/vivekratnavel/omniboard (downloaded Dec. 3, 2020); 7 pgs.

Comet, "Build Better Models Faster"; https://www.comet.m;/site/; (downloaded Dec. 3, 2020); 8 pgs.

Weight & Biases, "Developer Tools for Machine Learning"; https://www.wandb.com (downloaded Dec. 3, 2020); 10 pgs.

AutoAI-IBM Cloud Pak for Data, "AutoAI Overview" https://dataplatform.cloud.ibm.com/docs/content; (downloaded Dec. 3, 2020); 3 pgs.

Overview of Kubeflow Pipelines—https://www.kubeflow.org/docs/pipelines/overview/pipelines-overview; (downloaded Dec. 3, 2020); 7 pgs.

Pachyderm, Explainable. Repeatable. Scalable. ; https://www.pachyderm.com (downloaded Dec. 3, 2020); 5 pgs.

Hummer, W. et al., "ModelOps: Cloud-Based Lifecycle Management for Reliable and Trusted AI"; IBM Research AI (2019); 8 pgs.

* cited by examiner

ASSISTANT FOR LARGE-SCALE MACHINE LEARNING EXPERIMENTS

BACKGROUND

Technical Field

The present disclosure generally relates to artificial intelligence and machine learning systems, and more particularly, to computer implemented methods and systems for assisting users performing large-scale machine learning experiments.

Description of the Related Art

In the machine learning world, to develop a machine learning model, data scientists run multiple experiments that can include thousands of jobs using different configurations. The outcome of these jobs are typically in the form of statistics, metrics, plots, and the like.

The data scientist evolves algorithms over time and every time an algorithm changes, a new set of jobs may be required. Different experiments can be grouped into a project and a typical machine learning project can include a set of algorithmic choices (e.g., algorithms, hyperparameters, configurations), a set of datasets optionally split into train and test data sets, and a set of evaluation metrics (e.g., accuracy, precision). The purpose of the project is to evaluate the algorithmic choices on a set of specified datasets using the provided evaluation metrics.

Every job uses a split of the input dataset into a train portion and a test portion. For more rigorous experiments, cross-validation is used, where N train-test splits (N input dataset variations) are created by random train-test splits of the input dataset. Train-test splits, however, provide limited insights, as the train portions and the test portions, if randomly drawn, are likely to share the same features distribution (e.g., scikit-learn train-test split). The random train-test splits do not provide insights into performance on, for example, corner cases or drift scenarios.

SUMMARY

According to various embodiments, a computing device, a non-transitory computer readable storage medium, and a method are provided for assisting a user to perform large-scale machine learning experiments.

In one embodiment, a computer implemented method of performing large-scale machine learning experiments includes expanding on one or more input datasets by systematically generating several data set drift splits. A set of experimental jobs corresponding to the generated data set drift splits are executed to generate experimental results. The experimental results are processed, consolidated, and clustered according to the generated data set drift splits.

In some embodiments, the method further includes receiving a project configuration including a range of machine learning algorithms, a range of hyperparameters for the machine learning algorithms, and evaluation metrics.

In some embodiments, the method further includes providing the consolidated and clustered experimental results to an interactive dashboard. In some embodiments, the interactive dashboard can display a comparison/trend analysis across the experimental jobs over time. In some embodiments, the method can further include providing one or more recommendations regarding performance of a machine learning model for one or more of the several data set drift splits. The performance of a machine learning model may, for example, be determined by its predictive error rate on a separate set of test data.

In some embodiments, the method can further include generating the several data set drift splits to provide a specific stress test of a machine learning model for presence of a domain shift.

In some embodiments, the method can generate a pre-deployment recommendation according to results of the specific stress test.

In some embodiments, one or more of the several data set drift splits are obtained by splitting the data according to one or more labelled features of the one or more input datasets.

In some embodiments, one or more of the several data set drift splits are obtained by splitting the data either by removing data nearest a random data point in the one or more input datasets or by removing data farthest from the random data point in the one or more input datasets.

According to various embodiments, a system for large-scale machine learning experimentation includes a project configuration module configured to provide a range of machine learning algorithms, a range of hyperparameters for the machine learning algorithms, and evaluation metrics. A drift split creating engine is configured to systematically generate one or more data set drift splits on one or more input datasets. A fan-in process engine is configured to consolidate, process and cluster experimental results from executing a set of experimental jobs on each of the one or more data set drift splits.

In some embodiments, the system further includes an interactive dashboard configured to provide the consolidated, processed and clustered experimental results to a user.

By virtue of the concepts discussed herein, a system and method are provided that improves upon the approaches currently used to develop machine learning algorithms. The system and methods discussed herein can improve the testing and development of machine learning algorithms by permitting their evaluation on systematically constructed datasets embodying desired characteristics including data drift.

These and other features will become apparent from the following detailed description of illustrative embodiments thereof, which is to be read in connection with the accompanying drawings.

BRIEF DESCRIPTION OF THE DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all the components or steps that are illustrated. When the same numeral appears in different drawings, it refers to the same or like components or steps.

DETAILED DESCRIPTION

In the following detailed description, numerous specific details are set forth by way of examples to provide a thorough understanding of the relevant teachings. However, it should be apparent that the present teachings may be practiced without such details. In other instances, well-known methods, procedures, components, and/or circuitry have been described at a relatively high-level, without detail, to avoid unnecessarily obscuring aspects of the present teachings.

Unless specifically stated otherwise, and as may be apparent from the following description and claims, it should be appreciated that throughout the specification descriptions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

As used herein, the term "job" refers to a single algorithmic configuration run on a single dataset/single drift scenario. The term "experiment" refers to a particular algorithmic configuration in a project, run across the full suite of datasets and drift scenarios under consideration. An experiment is made from a group of jobs. The term "project" refers to the exploration of a set of algorithmic choices or configurations across a range of datasets and data drift scenarios. A project is made from a group of related experiments.

As discussed in greater detail below, the present disclosure generally relates to a machine learning experimentation system that can receive a project configuration, including a range of machine learning algorithms, range of hyperparameters, input data sets, and evaluation metrics, corresponding to N experiments, each running a single algorithmic configuration. The project configuration can be automatically determined by the system or configured by a data scientist. The machine learning experimentation system can expand each experiment to systemically generate M drift splits for each of D datasets, discussed in more detail below. This process is referred to as "fan-out". The machine learning system can create an expanded experiment including M×D×N jobs, can orchestrate the execution of the M×D×N jobs on an under lying computation platform, and can gather results for the M×D×N jobs. The machine learning system can further process the results to consolidate the individual drift split jobs to derive insight from the drift splits. This process is referred to as "fan-in".

Finally, the machine learning system can present consolidated results to the data scientist in an interactive dashboard to support sorting and ranking of the results of an individual project and comparison/trend analysis across comparable experiments in projects over time. Thus, the system, according to embodiments of the present disclosure, enables and supports a practice of robust large-scale human-in-the-loop experimentation to enhance the productivity of data scientists that otherwise would not be possible without the system according to aspects of the present disclosure.

Further, as discussed in greater detail below, the present disclosure generally relates to a machine learning experimentation system that, in addition to randomly drawing train-test splits of the datasets, can systematically construct train-test splits to create specific drift scenarios between the train portion and the test portion of the datasets, where each train-test split encodes a specific drift scenario. An experiment run using a constructed drift scenario can provide insights into how the machine learning algorithm performs under the encoded drift scenario. In a meta-learning problem, the train-test splits can be replaced with a train-test-prod split to handle the training of the original model, training the meta-model, and evaluation. Train-test-prod datasets can be varied independently, using the same or different procedures to generate each, as described in greater detail below.

The system can be used, for example, to assist data scientists in developing machine learning algorithms and models. Further, the system can be used to specifically stress test a machine learning model for the presence of a domain shift as part of a pre-deployment domain test before deploying the model into a new domain. The system can answer questions about how the model would perform under specific drift scenarios. Pre-deployment recommendations and warnings can then be generated according to the results obtained for specific drift scenarios as part of the pre-deployment testing.

Reference now is made in detail to the details illustrated in the accompanying drawings and discussed below.

Figure 1:
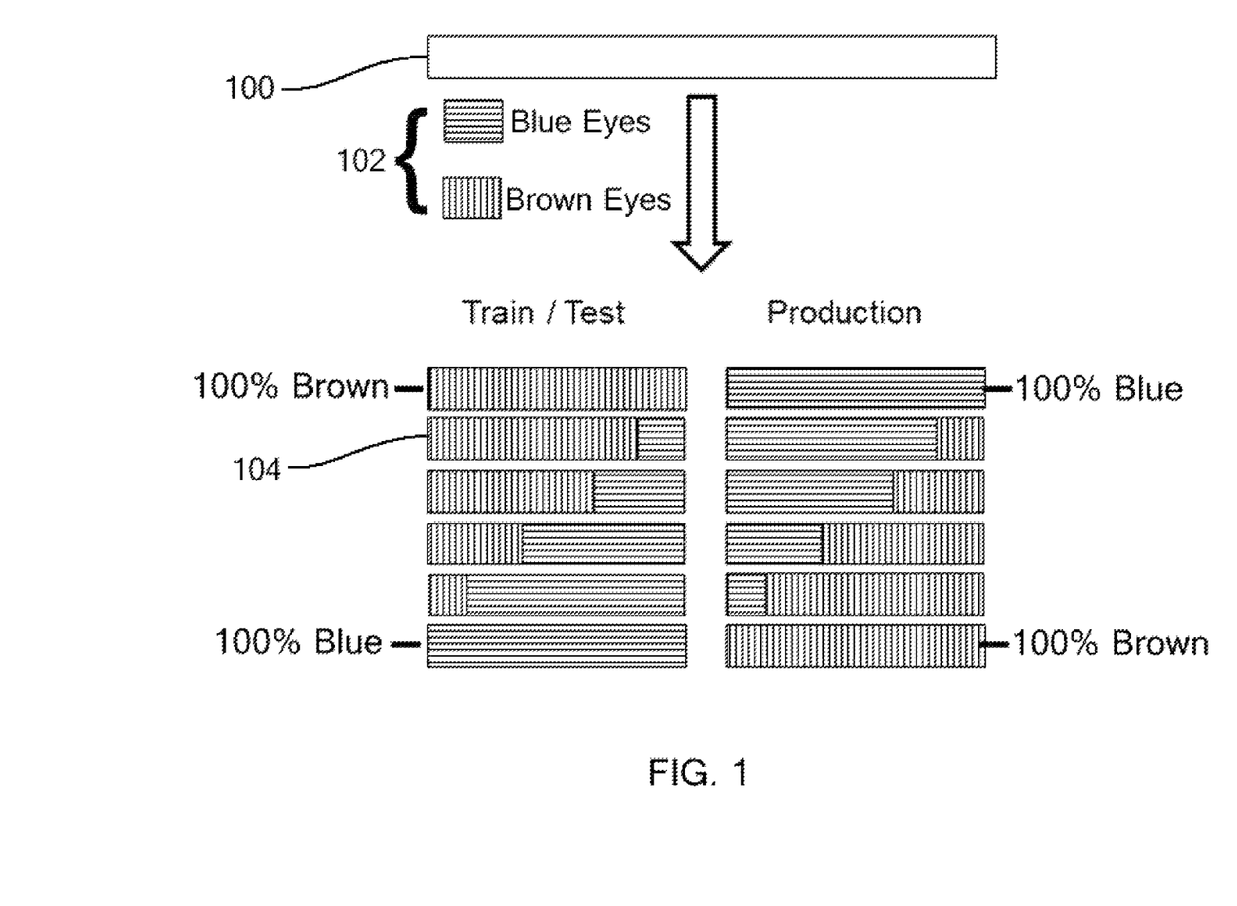
FIG. 1 is a pictorial representation of splitting a dataset in a directed manner according to one or more features, consistent with an illustrative embodiment.

Referring to FIG. 1, an example of providing dataset split scenarios is shown, where the dataset is split according to a specific feature. A labeled dataset 100 can be labeled according to one or more features, such as eye color, credit score, or the like. A key feature 102, such as eye color, can be selected, and a ratio 104 of that feature in the test portion and train portion of the dataset can be used in a project. Similarly, data splits can also be used in production in order to determine correlation between the test/train datasets and the production datasets.

Figure 2:
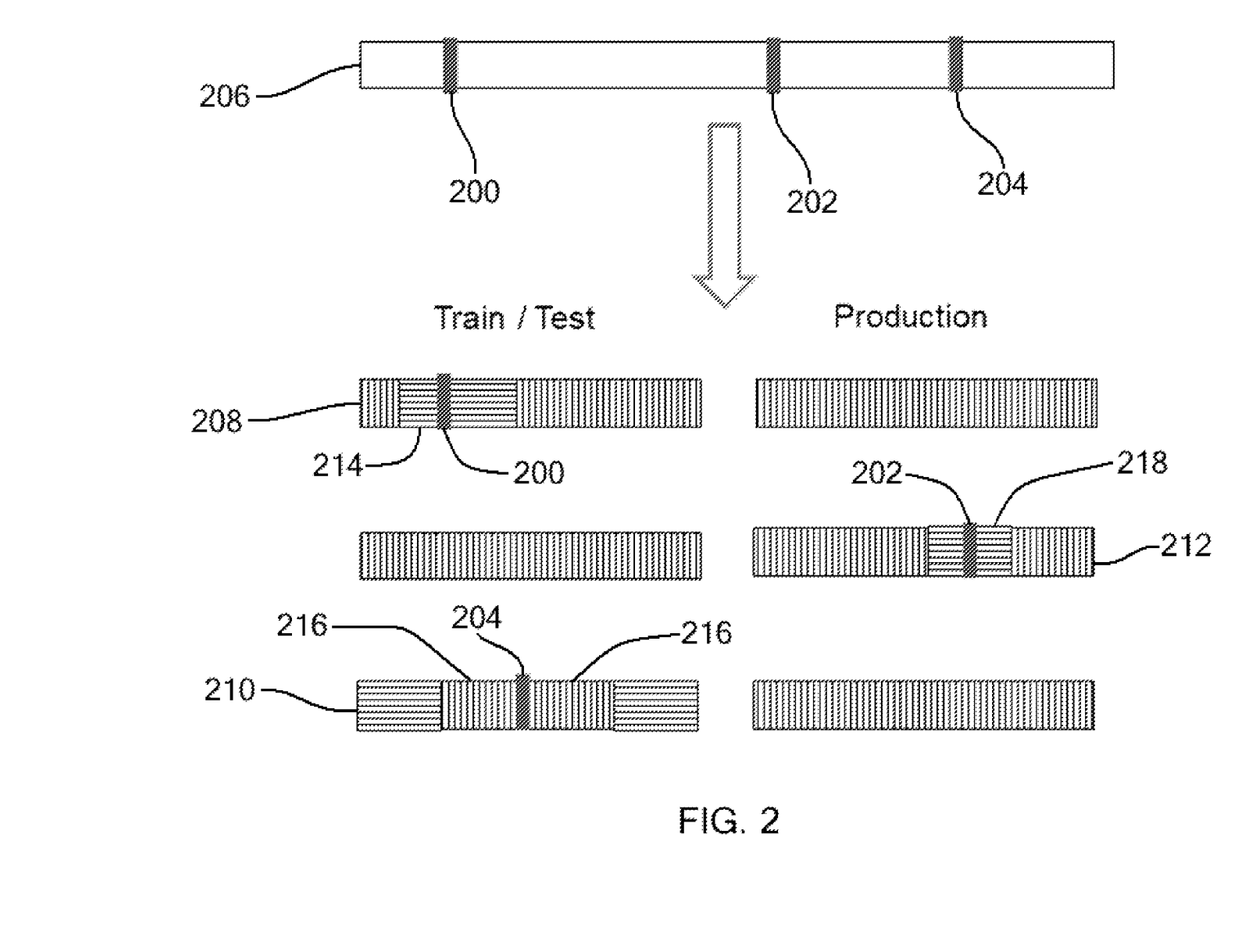
FIG. 2 is a pictorial representation of splitting a dataset in a directed manner by removing a predetermined amount of nearest or farthest neighbors of a chosen data point, consistent with an illustrative embodiment.

FIG. 2 provides another example of providing a dataset split scenario. Randomly selected datapoints 200, 202, 204 may be selected from a labeled dataset 206. A test-train split scenario may be obtained by removing a predetermined fraction 214 of data nearest selected datapoint 200, as illustrated in representation 208. Alternatively or additionally, a test-train split scenario may be obtained by removing a predetermined fraction 216 of data farthest selected datapoint 204, as illustrated in representation 210. Likewise, in production, similar split scenarios may be used to determine correlation between the test/train datasets and the production datasets. For example, as illustrated in representation 212, the data 218 nearest the datapoint 202 can be removed. In summary, in this method, dataset split scenarios can be established by (1) choosing random data points, (2) choosing a fraction, test/training versus production, and nearest versus farthest, and (3) removing the appropriate fraction of data.

Other dataset split scenarios may also be used depending on the data and goals of the project. For example, in some embodiments, drift scenarios can be created by time, where training data can be obtained from one time period, but the test data can be obtained from a different time period.

Example algorithms for creating drift scenarios are illustrated below. Such examples are not intended to limit the scope of the present disclosure and are illustrative of one manner in which a drift scenario algorithm may be constructed. Other constructions, as may be understood by one skilled in the art, are contemplated within the scope of the present disclosure.

---

Algorithm 1 Algorithm to create linear-skew drift scenarios

---

Input: Dataset $X \subset \chi$; $p_{tr}$, $p_{te}$, $p_{pr} \in [0, 1] : p_{tr}+p_{te}+p_{pr} = 1$; Feature dimension $F : \chi^{(F)} \subset \chi$; threshold function $t : \chi^{(F)} \to \{X_A, X_B\}$; Sampling ratio $R \in [0, 100]$; minibatch size b
Output: $X_{tr}, X_{te}, X_{pr} \subset X$
$X_A, X_B, X_{tt}, X_{pr} \leftarrow \{ \}$
for x in X do
   Add x to $t(X^{(F)}) \in \{X_A, X_B\}$ ▷ Add data point to bucket, defined by threshold t
end for
while $|X_A| > b$ and $|X_B| > b$ do ▷ Randomly sample $X_{tt}$, $X_{pr}$ from buckets until out of data points
   Add $(p_{tr} + p_{te}) \times \dfrac{R}{100} \times b$ points from $X_A$ and $(p_{tr} + p_{te}) \times \left(1 - \dfrac{R}{100}\right) \times b$ points from $X_B$ into $X_{tt}$
   Add $p_{pr} \times \left(1 - \dfrac{R}{100}\right) \times b$ points from $X_A$ and $p_{pr} \times \dfrac{R}{100} \times b$ points from $X_B$ into $X_{pr}$
end while
Randomly split $X_{tr}, X_{te} \leftarrow X_{tt}$ with proportions $\dfrac{p_{tr}}{p_{tr} + p_{te}}$ and $\dfrac{p_{te}}{p_{tr} + p_{te}}$

---

Algorithm 2 Algorithm to create nearest-neighbors drift scenarios

---

Input: Dataset $X \subset \chi$; $p_{tr}, p_{te}, p_{pr} \in [0, 1] : p_{tr}+p_{te}+p_{pr} = 1$; $P_{set} \in [0, 1]$; $P_{near} \in [0, 1]$; $P_{down} \in [0, 1]$
Output: $X_{tr}, X_{te}, X_{pr} \subset X$
Randomly split data into $X_{pr}$ and $X_{tt}$ with proportions $p_{pr}$ and $1 - p_{pr}$
With probability $P_{set}$, set downsample set $X_{down} = X_{tt}$ and $X_{rand} = X_{pr}$, else $X_{down} = X_{pr}$ and $X_{rand} = X_{tt}$ ▷ Choose distribution to bias non-randomly
Choose point $p \in X_{down}$ at random
Order points $x \neq p \in X_{down}$ by distance from p
Choose D=nearest (N) with probability $P_{near}$ else D=furthest (F)    ▷ Choose nearest or furthest bias
Remove the fraction $P_{down}$ points which are $D \in \{N, F\}$ from p
Remove fraction $P_{down}$ from $X_{rand}$ randomly ▷ Randomly downsample non-biased distribution
Randomly split $X_{tr}, X_{te} \leftarrow X_{tt}$ with proportions $\dfrac{p_{tr}}{p_{tr} + p_{te}}$ and $\dfrac{p_{te}}{p_{tr} + p_{te}}$

---

Once the drift scenarios are established, there are challenges to manage the scale and large number of resulting experiments and interpreting the experimental results can be tedious, as there is a large amount of information. Aspects of the present disclosure provide a system and method for supporting and enabling a practice of robust large-scale experimentation that allows for data scientists to interact via an interactive dashboard. The system and method can include a methodology aspect, where systematic coverage is ensured across the space of drift scenarios, and grouping is enabled of the experimental results by responsible drift scenarios to facilitate root cause diagnostics of the results. The system and method can include a management aspect, where, because adding M drift splits multiplies the number of experiments by a factor of M, intelligent process of the results of these large scale experiments can be provided. These aspects are described below with respect to operation of the system 300 of FIG. 3.

Figure 3:
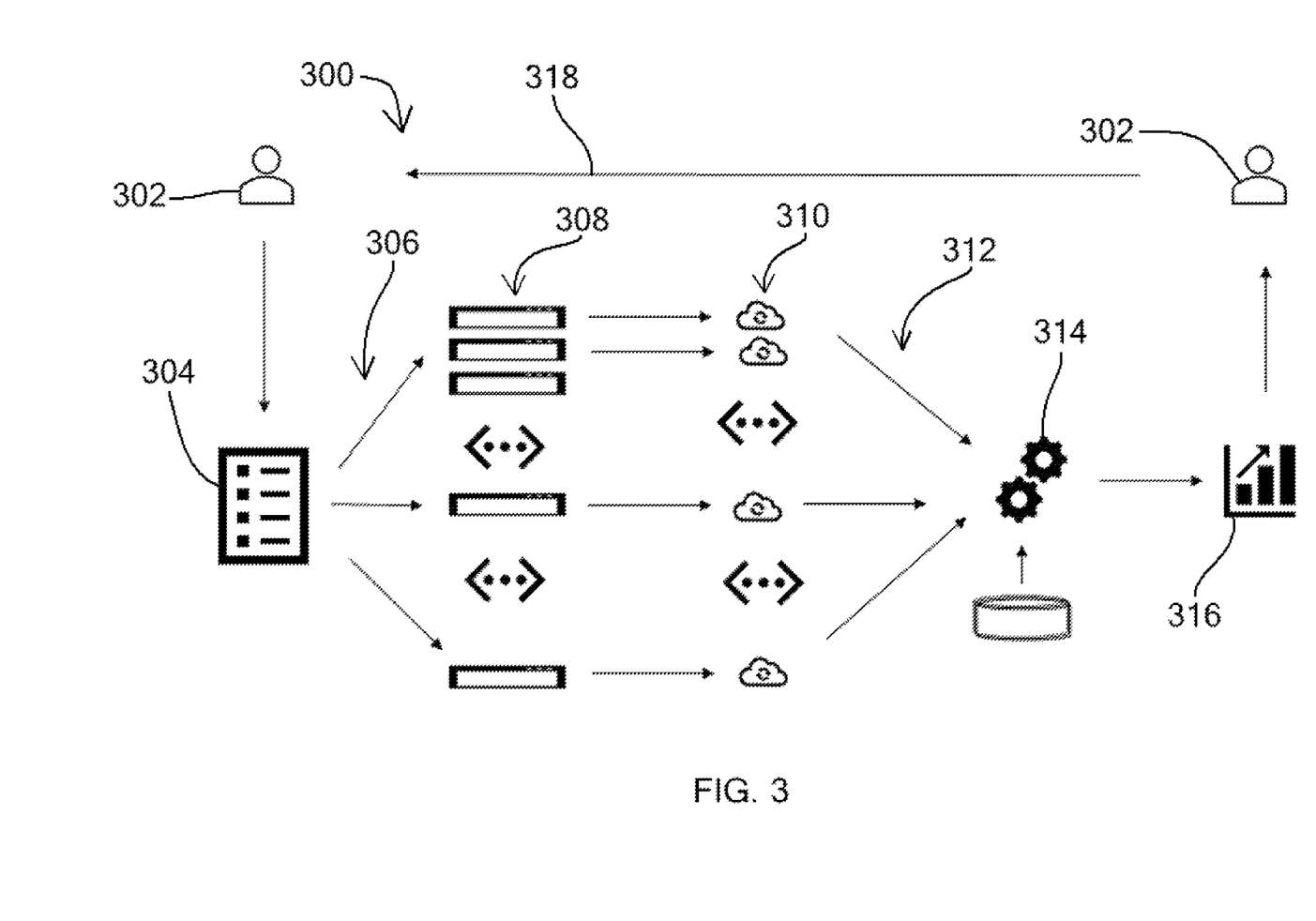
FIG. 3 is a flow diagram illustrating a method of using a machine learning experimentation system, consistent with an illustrative embodiment.

Referring now to FIG. 3, a high-level representation of an experimentation assistant system 300 to manipulate the data for large-scale machine learning experiments is shown consistent with an illustrative embodiment of the present disclosure. A data scientist 302 can provide the initial project configurations. These configurations can include the range of machine learning algorithms, the range of hyperparameters, the input data sets, the evaluation metrics, and the like. The input into the experimentation assistant system 300 can be, for example, with a toolkit or a machine learning algorithm along with the possible configuration parameters that are specific to the algorithm. The experimentation assistant system 300 can have a default pre-defined set of datasets, from a library or central repo, for example, or the system 300 can accept new datasets as part of the input configuration.

The input data space 306 can be expanded as indicated by arrows 306, where the dataset is split into train and test data using various data drift simulation strategies, as described above in greater detail. In some embodiments, the train data can be obtained from one distribution and the test data can be obtained from a different feature distribution. For example, in a dataset where eye color is a feature selected from blue or brown, the train data can include 'all brown' but the test data can be 'all blue'. Various drift scenarios can be created by varying the proportion between two or more feature buckets. At this point, the input data space 306 has been expanded, where the input configuration is now a combination of dataset splits 308 and the inputs that are specific to the algorithms.

The system 300 can orchestrate execution of all the jobs in the project as indicated at icons 310. A large number of jobs can be started using different infrastructures available. For example, in an embodiment, there could be 200 splits and 100 different input configurations. A total of 20,000 jobs will be started for this project.

The outcome/result from the project will be a set of results/metrics for each job, giving aggregated results/metrics for each experiment. Arrows 312 indicate how the results fan-in to reduce the data into usable results. For example, the jobs can be filtered, ranked, or clustered based on the characteristics of the input datasets/drift scenarios for each job and by the value of the output metrics for each job. By encoding the input dataset/drift scenario characteristics and the output results as feature vectors, existing clustering algorithms (e.g., K-means or Dbscan) can be used to reduce the large number of jobs to a smaller number of computed result clusters 314. Low-performance dataset/drift scenario clusters can help identify algorithmic failure modes. Small or isolated clusters can help identify outliers or anomalies in the experiment.

Furthermore, using customizable parametrizations describing dataset/drift scenario characteristics for filter/clustering allows for correlation analysis, permitting the user to determine which kinds of scenarios led to high/low performance. For example, drift scenarios can be ordered by difficulty, as measured by a probe model, where scenario difficulty can be correlated with algorithm performance.

To summarize the project, result metrics can be aggregated within each experiment in the project, within each computed cluster, and over the entire project (e.g., aggregation as the mean or median metric values can be used). In some embodiments, clusters and experiments can be ranked by sorting the aggregate result metrics for the clusters.

The project, experiment, and cluster aggregations (also referred to as signatures) can be used to compare different projects, experiments, and clusters over time to understand performance trends over time. The system 300 can ensure that only valid comparisons are made, which are comparisons among projects, experiments, and clusters that are based on the same data set split scenarios. For example, a change in the machine learning algorithm may lead to a different set of clusters. By comparing the delta between the clusters across experiments from different projects, it can be possible to determine how the change in the algorithm impacts the results.

The computed result clusters 314 can be presented to the data scientist 302 in an interactive dashboard 316. The dashboard 316 can allow the data scientist 302 to sort and rank results at different granularities, such as by jobs, job clusters, experiments, and the like. The dashboard 316 can also provide tracking of aggregate metrics, aggregated at cluster, experiment and project granularities, over time to monitor algorithm development progress. Typically, only comparable aggregations are shown in a trend view, such as aggregations based on the same data split scenarios.

The data scientist 302, based on insight gained from project analysis, can devise a subsequent round of experiments as illustrated at arrow 318.

Figure 4:
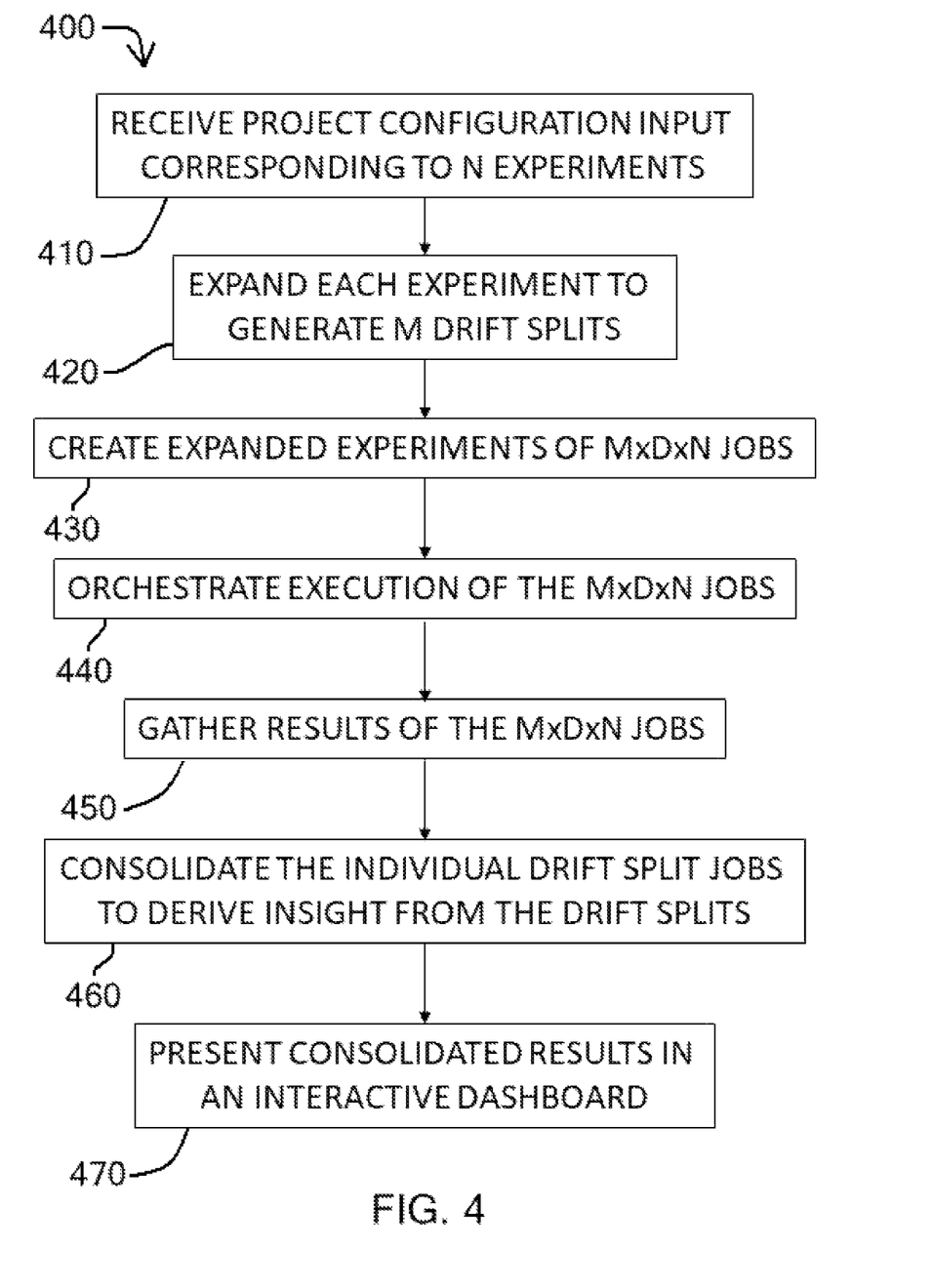
FIG. 4 is a flow chart illustrating acts involved with operating a machine learning experimentation system, consistent with an illustrative embodiment.

With the foregoing overview of the example system 300 (see FIG. 3), it may be helpful now to consider a high-level discussion of an example process. To that end, FIG. 4 presents an illustrative process related to the steps performed by the machine learning experimentation system 300. Process 400 is illustrated as a collection of blocks, in a logical flowchart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform functions or implement abstract data types. In each process, the order in which the operations are described is not intended to be construed as a limitation, and any number of the described blocks can be combined in any order and/or performed in parallel to implement the process. For discussion purposes, the process 400 is described with reference to the machine learning experimentation system 300 FIG. 3.

Referring to FIG. 4, the process 400 for performing large-scale machine learning experiments can include an act 410 of receiving project configuration input corresponding to N experiments. This input, as discussed above, can include a range of machine learning algorithms, range of hyperparameters, input data sets, evaluation metrics, and the like. The process 400 can further include an act 420 of expanding each experiment to systematically generate M drift splits for each of D datasets. As used herein, the term "systematically generate" refers to generating drift splits according to a predefined feature, time, or systematic removal of data from a dataset, as described herewithin. "Systematically generated" drift splits are not randomly generated as in conventional drift split generation.

An act 430 can create expanded experiments of M×D×N jobs. At act 440 the system can orchestrate execution of the M×D×N jobs. At act 450, the results of the M×D×N jobs are gathered. The process 400 can further include consolidating the individual drift split jobs to derive insight from the various drift splits from act 420. At act 470, the consolidated results can be presented to a data scientist in an interactive dashboard, where the dashboard can support sorting and ranking of the results of an individual project and can provide comparison/trend analysis across comparable experiments in multiple projects over time.

Figure 5:
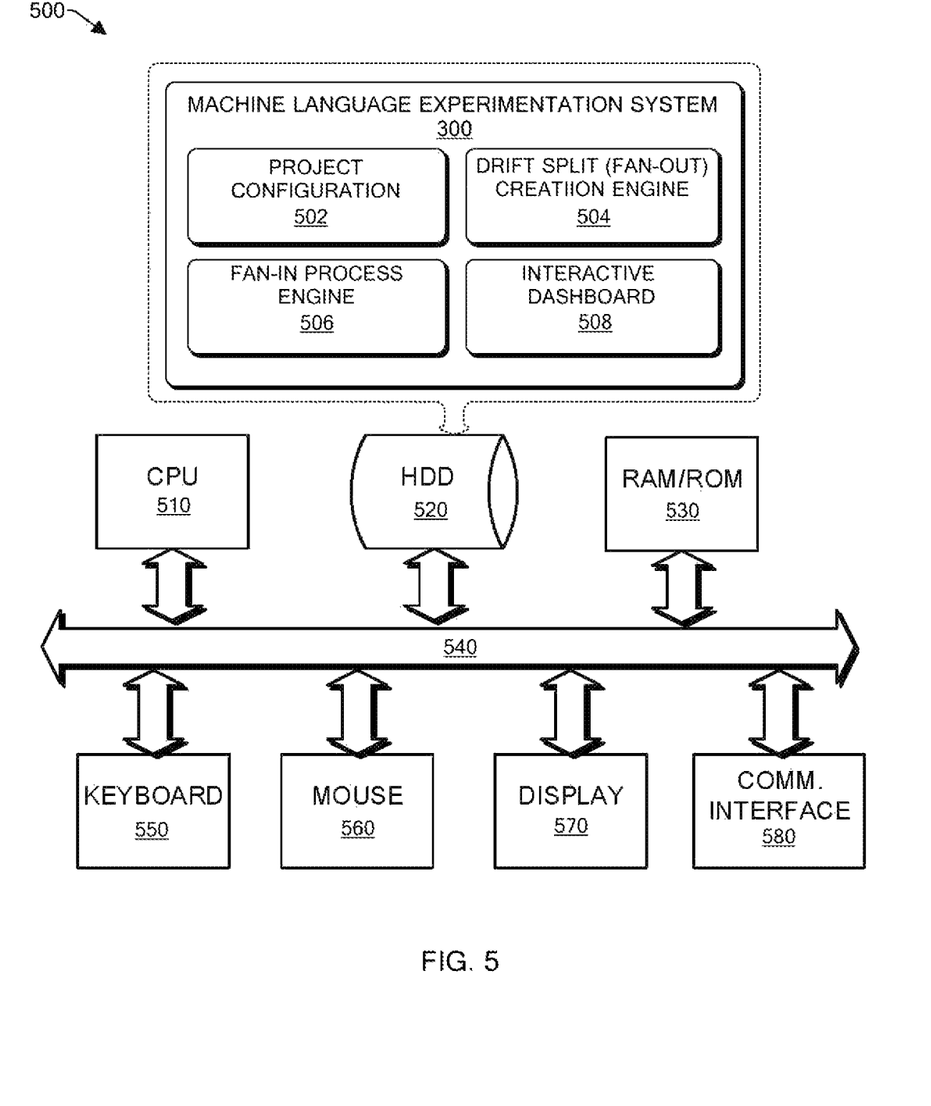
FIG. 5 is a functional block diagram illustration of a computer hardware platform that can be used to implement the machine learning experimentation system of FIG. 3.

FIG. 5 provides a functional block diagram illustration of a computer hardware platform 500 that can be used to implement a particularly configured computing device that can host a machine learning experimentation system 300 (see FIG. 3). The machine learning experimentation system 300, as discussed above, can include a project configuration module 502, where project configuration information, as discussed above, can be stored, added, or edited. The system 300 can further include a drift split creation engine 504, where drift splits of the datasets may be performed according to the methods discussed above. The system 300 can further include a fan-in process engine, where the large amount of data (e.g., "large data" that cannot be processed by a human but involves an appropriately configured computing device) can be consolidated and clustered into a more user-friendly format that can be displayed on a user interface, such as display 570. The system 300 can also include an interactive dashboard module 508, permitting a data scientist to review data or alter experimental conditions based on the data. In particular, FIG. 5 illustrates a network or host computer platform 500, as may be used to implement an appropriately configured system 300, as illustrated in FIG. 3.

The computer platform 500 may include a central processing unit (CPU) 510, a hard disk drive (HDD) 520, random access memory (RAM) and/or read only memory (ROM) 530, a keyboard 550, a mouse 560, a display 570, and a communication interface 580, which are connected to a system bus 540.

In one embodiment, the HDD 520, has capabilities that include storing a program that can execute various processes, such as those of the machine learning experimentation system 300, in a manner described herein.

CONCLUSION

The descriptions of the various embodiments of the present teachings have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

While the foregoing has described what are considered to be the best state and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

The components, steps, features, objects, benefits and advantages that have been discussed herein are merely illustrative. None of them, nor the discussions relating to them, are intended to limit the scope of protection. While various advantages have been discussed herein, it will be understood that not all embodiments necessarily include all advantages. Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

Numerous other embodiments are also contemplated. These include embodiments that have fewer, additional, and/or different components, steps, features, objects, benefits and advantages. These also include embodiments in which the components and/or steps are arranged and/or ordered differently.

Aspects of the present disclosure are described herein with reference to a flowchart illustration and/or block diagram of a method, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of an appropriately configured computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The call-flow, flowchart, and block diagrams in the figures herein illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing has been described in conjunction with exemplary embodiments, it is understood that the term "exemplary" is merely meant as an example, rather than the best or optimal. Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments have more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A computer implemented method of performing large-scale machine learning experiments, comprising:
    expanding on one or more input datasets by systematically generating a plurality of data set drift splits, wherein adding M drift splits multiplies a number of experiments by a factor of M;
    executing a set of experimental jobs corresponding to the generated data set drift splits to generate experimental results;
    consolidating and clustering the experimental results according to the generated data set drift splits, and
    displaying one or more recommendations regarding a performance of a machine learning model for one or more of the a plurality data set drift splits.

2. The computer implemented method of claim 1, further comprising receiving a project configuration including a range of machine learning algorithms, a range of hyperparameters for the machine learning algorithms, and evaluation metrics.

3. The computer implemented method of claim 1, further comprising providing the consolidated and clustered experimental results to an interactive dashboard.

4. The computer implemented method of claim 3, further comprising displaying a comparison or trend analysis across the experimental jobs over time.

5. The computer implemented method of claim 1, further comprising generating the plurality of data set drift splits to provide a specific stress test of a machine learning model to determine whether a domain shift with respect to a machine learning model prediction is present.

6. The computer implemented method of claim 5, further comprising generating a pre-deployment recommendation according to results of the specific stress test.

7. The computer implemented method of claim 1, wherein one or more of the plurality of data set drift splits are obtained by splitting the dataset according to one or more labelled features of the one or more input datasets.

8. The computer implemented method of claim 1, wherein one or more of the plurality of data set drift splits are obtained by splitting the dataset either by removing data nearest a random data point in the one or more input datasets or by removing data farthest from the random data point in the one or more input datasets.

9. A system for large-scale machine learning experimentation, comprising one or more processors running modules and engines including:
 a project configuration module configured to provide a range of machine learning algorithms, a range of hyperparameters for the machine learning algorithms, and evaluation metrics;
 a drift split creating engine configured to systematically generate one or more data set drift splits on one or more input datasets, wherein adding M drift splits multiplies a number of experiments by a factor of M; and
 a fan-in process engine configured to consolidate, process and cluster experimental results from executing a set of experimental jobs on each of the one or more data set drift splits,
 wherein an interactive dashboard is configured to display one or more recommendations regarding a performance of a machine learning model for the one or more data set drift splits.

10. The system of claim 9, further comprising the interactive dashboard configured to provide the consolidated, processed and clustered experimental results to a user.

11. The system of claim 9, wherein the one or more data set drift splits are generated by the drift split creation engine as a specific stress test of a machine learning model to determine whether a domain shift with respect to a machine learning model prediction is present.

12. A non-transitory computer readable storage medium tangibly embodying a computer readable program code having computer readable instructions that, when executed by a processor, causes a computer device to carry out a method of performing large-scale machine learning experiments, the method comprising:
 expanding on one or more input datasets by systematically generating a plurality of data set drift splits, wherein adding M drift splits multiplies a number of experiments by a factor of M;
 executing a set of experimental jobs corresponding to the generated data set drift splits to generate experimental results;
 consolidating and clustering the experimental results according to the generated data set drift splits; and
 displaying one or more recommendations regarding performance of a machine learning model for one or more of the plurality of data set drift splits.

13. The non-transitory computer readable storage medium of claim 12, wherein the execution of the code by the processor further configures the computing device to perform an act comprising:
 receiving a project configuration including a range of machine learning algorithms, a range of hyperparameters for the machine learning algorithms, and evaluation metrics.

14. The non-transitory computer readable storage medium of claim 12, wherein the execution of the code by the processor further configures the computing device to perform an act comprising:
 providing the consolidated and clustered experimental results to an interactive dashboard.

15. The non-transitory computer readable storage medium of claim 14, wherein the execution of the code by the processor further configures the computing device to perform an act comprising:
 displaying a comparison or trend analysis across the experimental jobs over time.

16. The non-transitory computer readable storage medium of claim 12, wherein the execution of the code by the processor further configures the computing device to perform an act comprising:
 generating the plurality of data set drift splits to provide a specific stress test of a machine learning model to determine whether a domain shift with respect to a machine learning model prediction is present.

17. The non-transitory computer readable storage medium of claim 16, wherein the execution of the code by the processor further configures the computing device to perform an act comprising:
 generating a pre-deployment recommendation according to results of the specific stress test.

\* \* \* \* \*